Sept. 23, 1947.   R. HAYNES   2,427,724
CONSTANT DRIVE VARIABLE SPEED TRANSMISSION
Filed Sept. 27, 1945   6 Sheets-Sheet 1
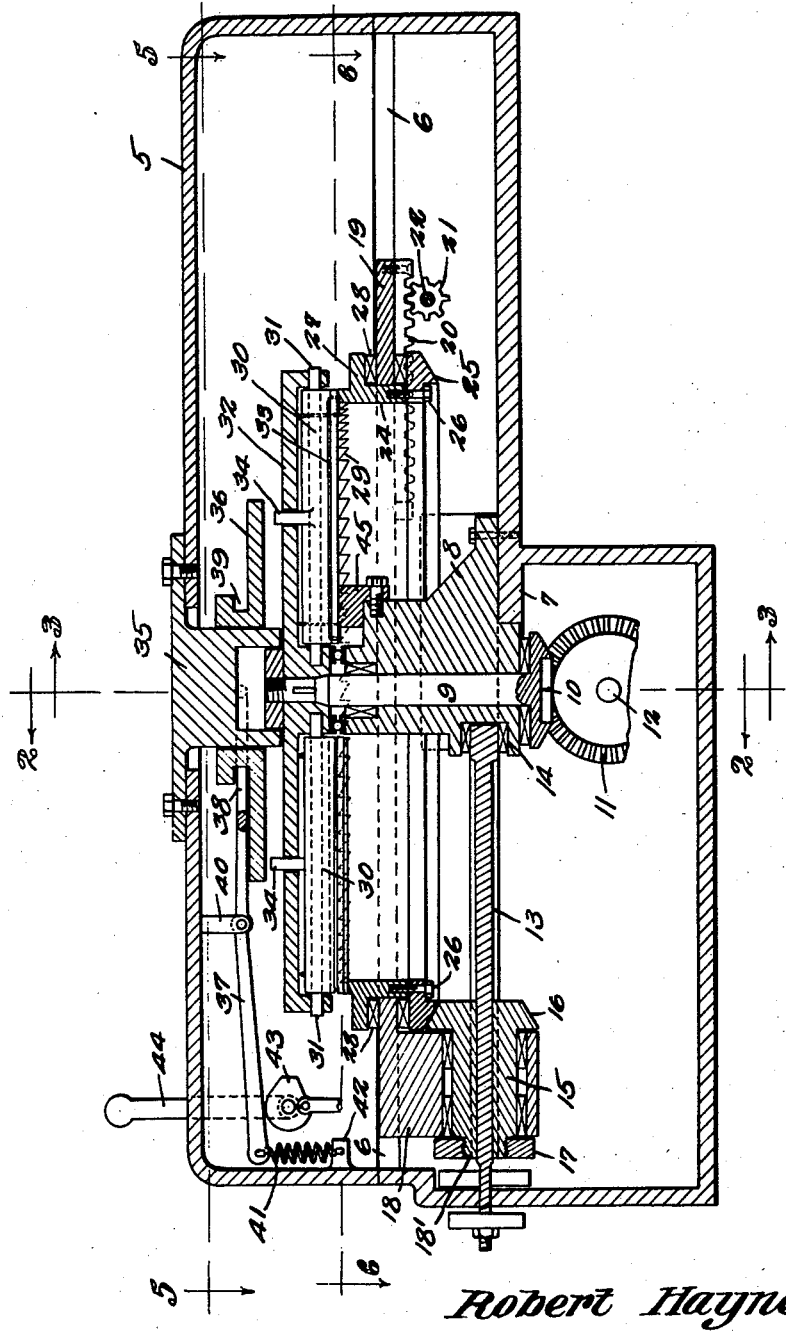
Robert Haynes
INVENTOR.
BY
ATTORNEYS.

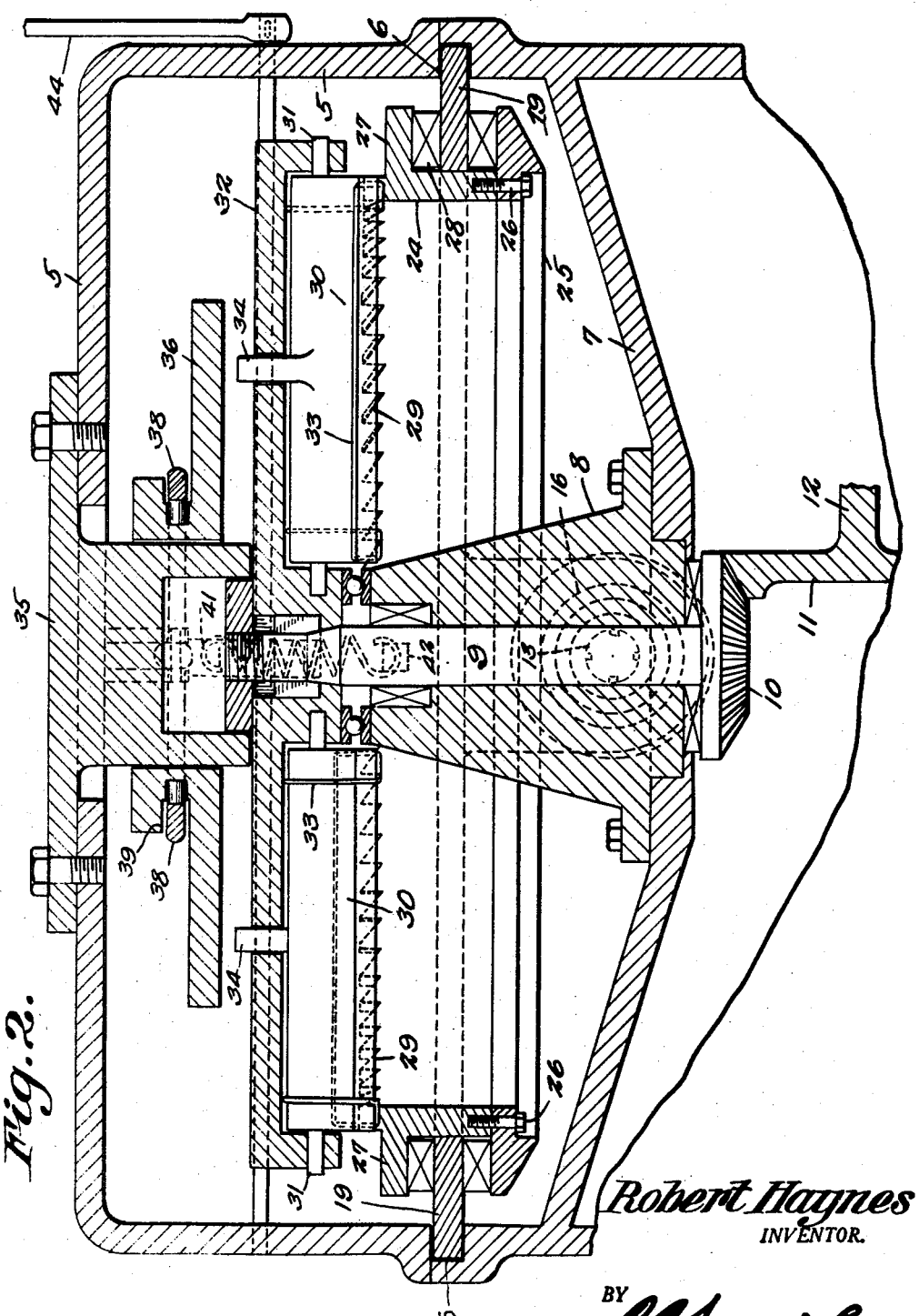

Sept. 23, 1947. R. HAYNES 2,427,724
CONSTANT DRIVE VARIABLE SPEED TRANSMISSION
Filed Sept. 27, 1945 6 Sheets-Sheet 6

Robert Haynes
INVENTOR.

BY
ATTORNEYS.

Patented Sept. 23, 1947

2,427,724

UNITED STATES PATENT OFFICE 2,427,724

CONSTANT DRIVE VARIABLE-SPEED TRANSMISSION

Robert Haynes, Los Angeles, Calif.

Application September 27, 1945, Serial No. 618,883

5 Claims. (Cl. 74—112)

1

This invention relates to variable speed transmissions of the positive drive type, the primary object of the invention being to provide a transmission wherein the ratio of the leverage between a driving shaft and a driven shaft in the transmission of power, may be changed to meet various requirements, controlling the speed of the gearing.

Another object of the invention is to provide a transmission of this character wherein a shifting of the transmission ring gear may be accomplished, while the transmission is actually driving under load.

Still another object of the invention is to provide a transmission embodying a driving ring gear, slidable with respect to the driven disk carrying pivoted elongated blade-like pawls adapted to engage the teeth of the ring gear, whereby rotary movement of the ring gear is transmitted to the disk and shaft connected therewith, to operate gearing at various speeds.

A further object of the invention is the provision of manually controlled means for moving the elongated blade-like pawls into and out of operation.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a longitudinal sectional view through a transmission housing and a transmission supported therein, the sliding ring gear of the transmission being shown in its normal position.

Figure 2 is a sectional view taken on line 2—2 of Fig. 1.

Figure 3:
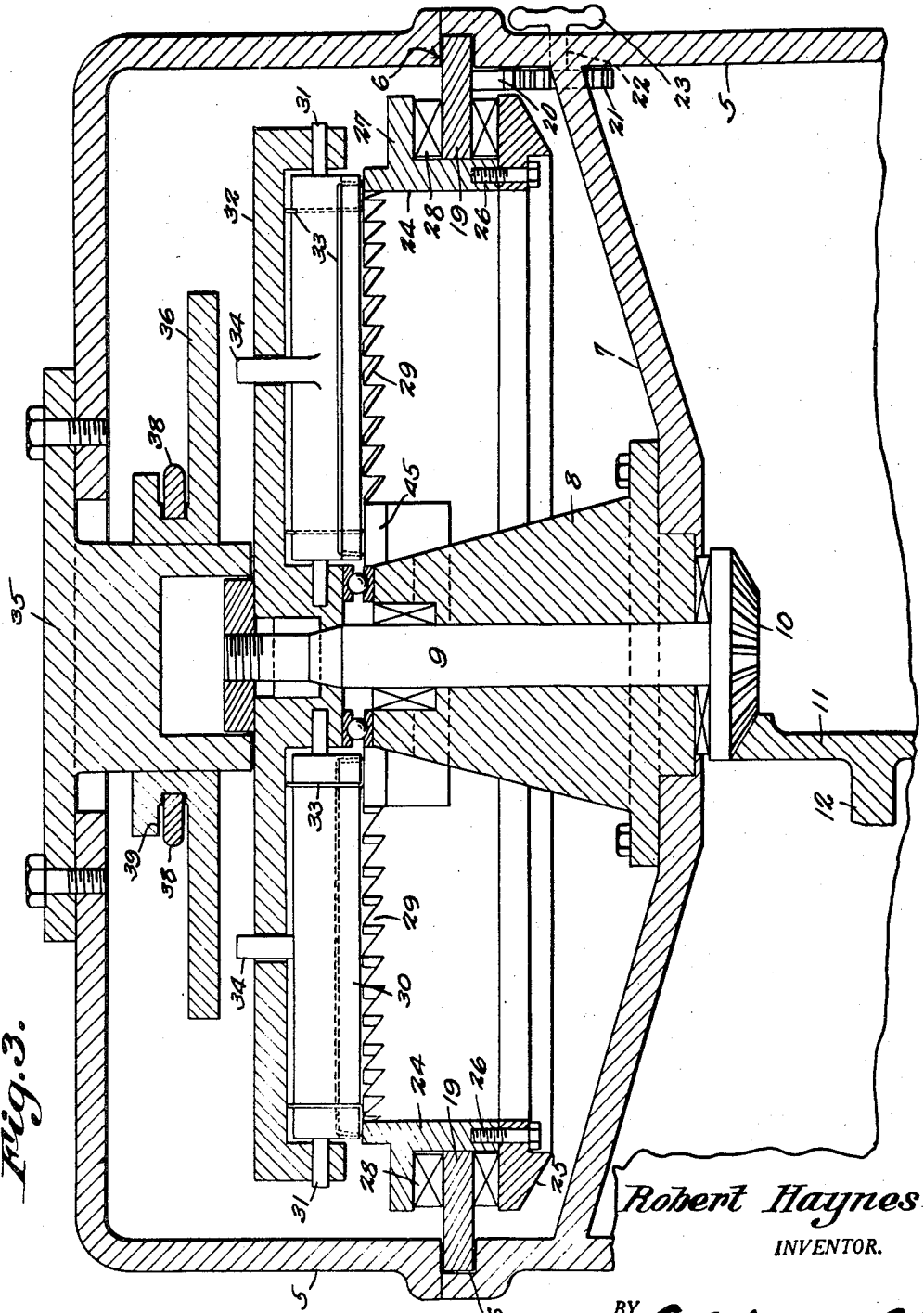
Figure 3 is a sectional view taken on line 3—3 of Fig. 1.

Referring to the drawings in detail, the transmission housing is indicated generally by the reference character 5, the side walls of the housing being formed with grooves 6 which are arranged on opposite sides of the housing in direct alignment with each other, the grooves extending longitudinally of the housing, as clearly shown by the drawings.

Disposed within the housing and arranged at a point between the top and bottom of the housing, is a partition 7 formed with a bearing opening to accommodate the bearing 8 which is bolted thereto, the bearing member 8 rising an appreciable distance above the partition 7.

The bearing 8 is formed with an opening in which the vertical shaft 9 is mounted, which shaft carries a pinion 10 at its lower end, the pinion 10 meshing with the pinion 11 mounted on one end of the driven shaft 12.

Figure 4:
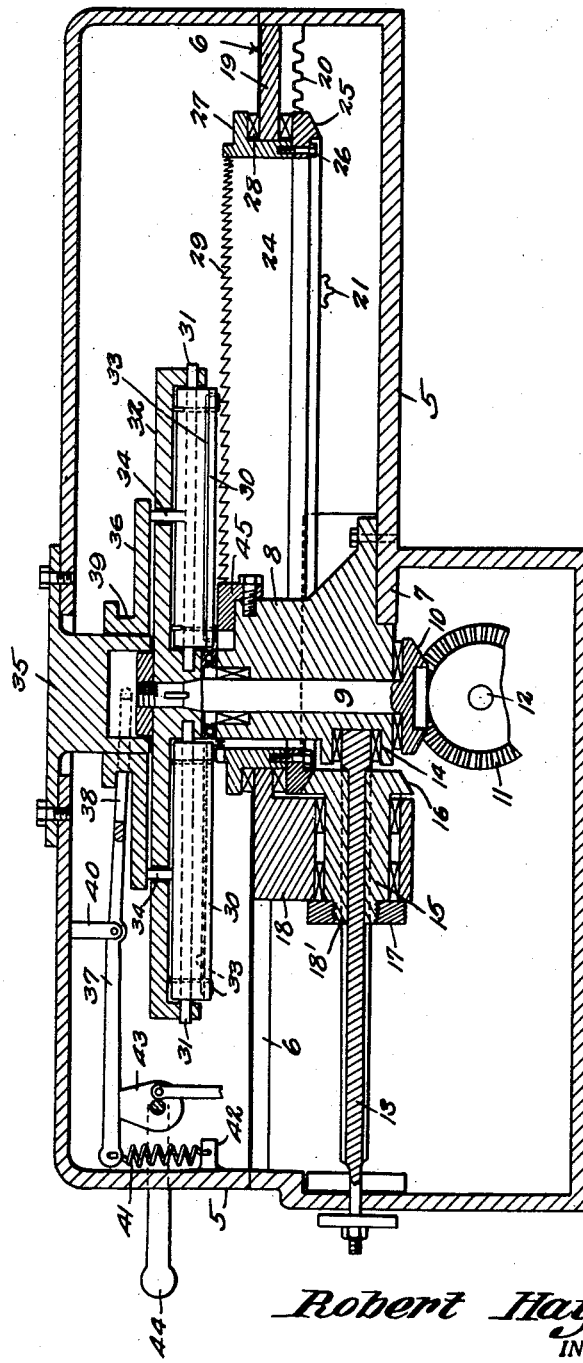
Figure 4 is a vertical sectional view through the transmission, showing the sliding ring gear as moved to the extreme right, the teeth of the ring gear contacting with one of the blade-like pawls, at a point adjacent to the inner end thereof, increasing the speed of the driven shaft.

The drive shaft is indicated by the reference character 13 and receives its power from a power device not shown. The inner end of the drive shaft 13 operates in bearings mounted within the recess 14 formed in the bearing 8, the drive shaft being formed with grooves disposed longitudinally thereof, which grooves accommodate keys formed integral with the elongated hub 15 of the drive pinions 16. A nut 17 is mounted on the threaded extension 18' of the elongated hub 15, and engages the bearing block 18 which forms a part of the adjusting plate 19, the bearing block depending from the central portion of the adjusting plate, as shown by Fig. 4 of the drawing. The side edges of the adjusting plate 19 operate in the grooves 6 to the end that the adjusting plate may be moved in a horizontal plane, longitudinally of the housing 5.

Secured to the lower surface of the adjusting plate 19, is a rack bar 20 which is engaged by the gear 21 mounted on the shaft 22 that in turn is manually controlled by means of the arm 23 mounted on one end of the shaft 22. Thus it will be seen that due to this construction, the adjusting plate 19 may be moved longitudinally of the grooves 6, for purposes to be hereinafter more fully described.

The adjusting plate 19 is formed with a circular opening for the reception of the collar 24, the collar 24 providing a support for the ring gear 25 which is secured thereto by means of the bolts 26. An annular flange 27 is formed exteriorly of the collar 24 and operates on the bearings 28 that rest on the adjusting plate 19. The drive pinion 16 being in mesh with the ring gear 25, operates to rotate the ring gear, together with the collar 24.

The upper edge of the collar 24 is formed with teeth 29 that are adapted to be engaged by the blade-like pawls 30 that are disposed thereabove, the blade-like pawls 30 being mounted on the shaft 31 that are in turn mounted in bearings formed in the disk 32. This disk 32 is keyed to the upper end of the vertical shaft 9, so that rotary movement of the disk 32 will result in a relative rotary movement of the shaft 9.

Spring members 33 are connected with the pawls 30, and contact with the undersurface of the disk 32, normally urging the pawls downwardly towards the teeth 29 to connect the disk with the collar 24.

Upwardly extended curved arms 34 are formed integral with the pawls 30, and these curved arms extend through openings formed in the disk 32, as clearly shown by Fig. 1 of the drawings.

Depending from the top of the housing 5, and disposed centrally thereof, is a bearing 35 over which the control disk operates, the control disk 36 being of a diameter to overlie the free ends of the curved arms 34, so that when the control disk is moved into engagement with the curved arms 34, the curved arms will operate to rock the pawls 30 against the action of the springs, disengaging the pawls 30 and teeth 29 of the collar 24.

Figure 5:
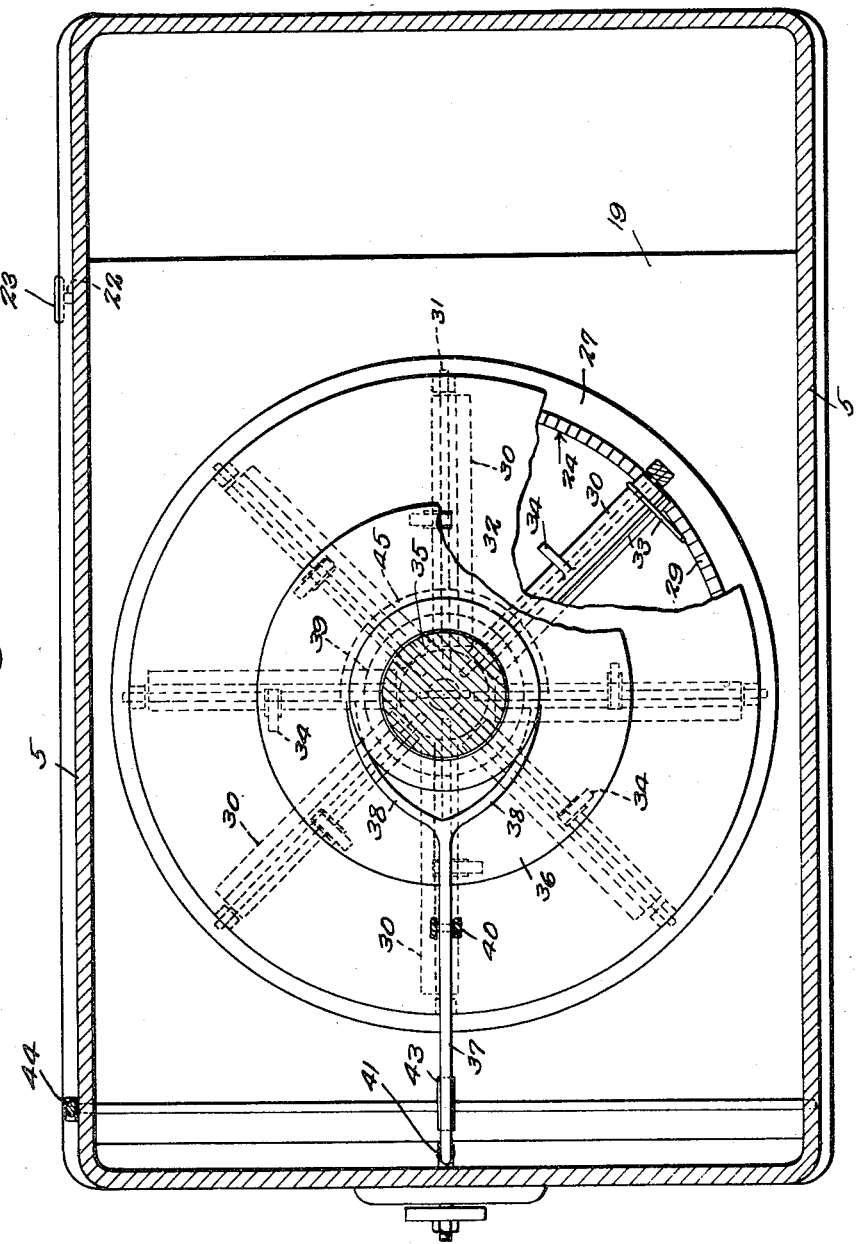
Figure 5 is a sectional view taken on line 5—5 of Fig. 1.
Figure 6:
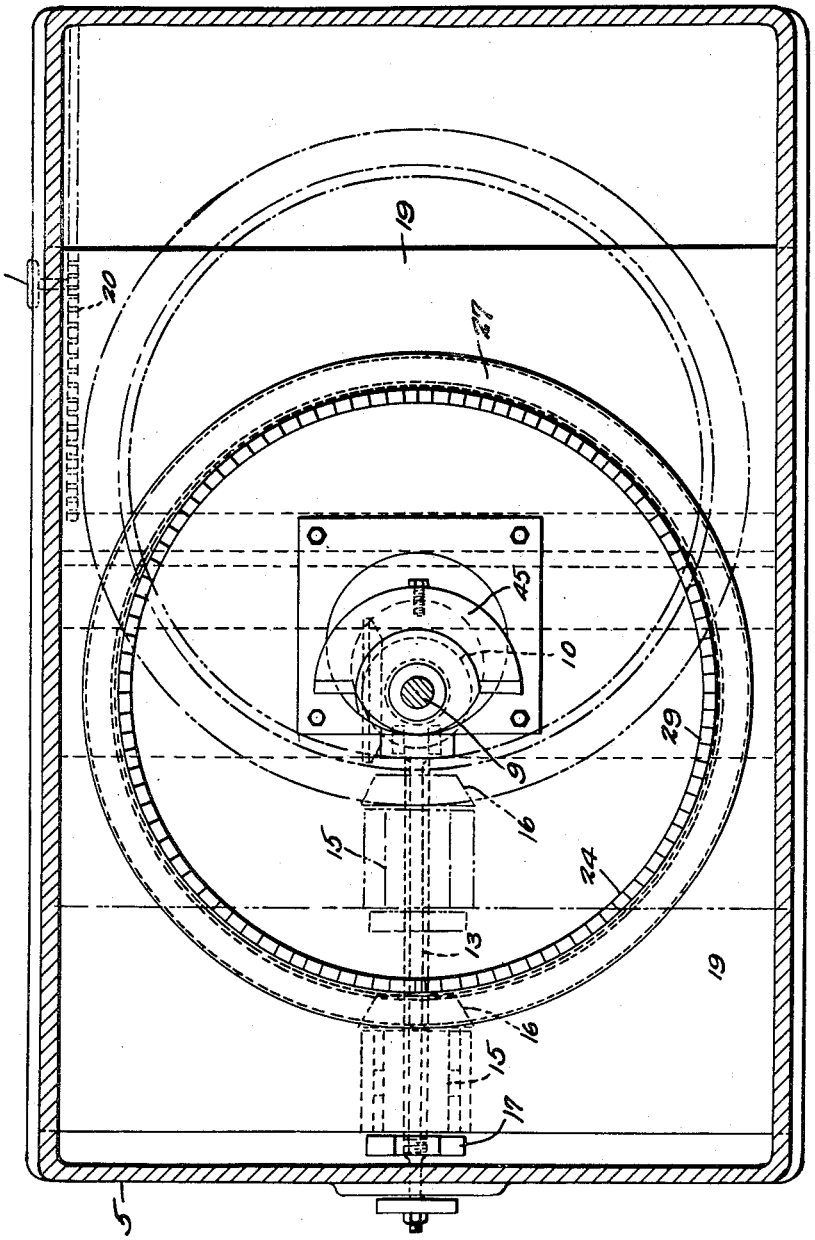
Figure 6 is a sectional view taken on line 6—6 of Fig. 1.

As clearly shown by Fig. 5 of the drawings, these pawls radiate from a common center, and the outer ends of the pawls are arranged in predetermined spaced relation with respect to each other. The control disk 36 is moved into engagement with the curved arms 34, by means of the lever 37 which is provided with a forked end 38 that rides in the annular groove 39, formed in the bearing of the control disk 36. The lever 37 is pivotally mounted on the bracket 40 or at a point intermediate the ends of the lever 37, the free end of the lever 37 having an opening in which one end of the coiled spring 41 is held. The opposite end of the coiled spring 41 is secured within an opening formed in the lug 42 that extends inwardly from the upper section of the housing 5. The action of the spring 41 is to normally hold the control disk 36 to its inactive position, or in the position shown by Fig. 1 of the drawings.

Operating directly under one end of the lever 37, is a cam 43 that is operated by means of the lever 44. This cam 43 moves with the lever 44, with the result that by moving the lever 44, the outer end of the lever 37 may be elevated, lowering the inner end of the lever 37 and consequently moving the disk 36 to actuate the curved arms 34 and the pawls with which they are connected, to move them to their inactive positions.

Mounted on one side of the bearing 8, is an arcuate shaped lifting bar 45 which is of a thickness, so that the uprights thereof lie in a plane above the upper edges of the teeth 29 of the collar 24, with the result that when the disk 32 is rotated to bring certain pawls 30 over the lifting bar, these pawls will be lifted out of contact with the teeth 29 of the collar, leaving only those pawls at the opposite side of the vertical shaft 9, in contact with the teeth of the collar to rotate with the collar.

From the foregoing it will be seen that due to the construction shown and described, power will be transmitted from the drive shaft through the drive pinion 16, to the ring gear 25 which in turn will transmit movement to the disk 32, through the teeth 29 of the collar 24 and pawls 30. Since the vertical shaft 9 is keyed to the disk 32, the shaft 9 will be rotated, and since pinion 10 carried at the lower end of the shaft 9 is in mesh with the pinion 11 that in turn is mounted on the driven shaft 12, shaft 12 will be rotated.

Should it be desired to regulate the speed of the driven shaft 12, it is only necessary to operate the shaft 22 to rotate the gear 21 to move the rack bar 20 and adjusting plate 19 with respect to the vertical shaft 9.

By moving the adjusting plate 19, it will be seen that teeth of the collar 24 will be moved so that they engage the pawls 30, at a point nearer the inner ends thereof which of course will speed up the gearing. Since a change of speed will take place with each movement of the adjusting plate 19, it will be obvious that a large range of variations of speed will be provided while the transmission is actually driving under load.

In actual operation collar 24 is normally slightly nearer the vertical shaft 9 in the front side or drive end, which means the position of collar 24 is slightly eccentric as far as its center is concerned to shaft 9; therefore this eccentric position of collar 24 accounts for the fact that the pawls 30 in the centermost front or forward position are the pawls that do all the pulling, and as one pawl passes this forward or foremost center line over the drive shaft 13, it gradually moves free from the teeth of collar 24 by reason of the pawl moving over the lifting bar or cam 45 while simultaneously, a like pawl is moving into the pulling position of the forward center line. This operation is being constantly repeated during the operation of the transmission.

What is claimed is:

1. A positive drive variable speed transmission, comprising a housing, a drive shaft and a driven shaft mounted within the housing, means for transmitting movement of the drive shaft to the driven shaft, said means embodying a slidable ring gear rotated by the drive shaft, a collar having teeth, secured to the ring gear, a rotary disk mounted above the collar, means for transmitting movement of the disk to the driven shaft, elongated horizontal pawls mounted on the disk to rotate therewith, the inner ends of said pawls being disposed adjacent to the center of the disk, said pawls adapted to engage the teeth of the collar at various points along the pawls, when said ring gear and collar are rotating and the collar is moved under the pawls, varying the speed of rotation of the disk and driven shaft, means for elevating and disengaging certain of the pawls from the teeth of the collar and means for moving the ring gear and collar longitudinally of the housing.

2. A positive drive variable speed transmission, comprising a housing, a drive shaft and a driven shaft operating within the housing, an adjusting plate mounted for horizontal sliding movement within the housing, a gear formed on the drive shaft, a ring gear secured to the adjusting plate and being in mesh with the gear mounted on the drive shaft, a collar having teeth formed on its upper edge, secured to the ring gear to move therewith, a vertical shaft within the housing and adapted to transmit movement to the driven shaft, a disk mounted above the collar, to which the vertical shaft is secured, a plurality of radially disposed pivoted pawls secured to the disk and adapted to engage the teeth of the collar, whereby movement of the ring gear and collar is transmitted to the disk through the pawls, mechanism for moving the adjusting plate adapted to cause contact between certain of the pawls and the collar at various positions throughout the lengths of the pawls, and means for elevating certain of the pawls out of engagement with the teeth of the collar.

3. A positive drive variable speed transmission, comprising a housing, a drive shaft and a driven shaft mounted within the housing, a vertical shaft, means for transmitting movement of the vertical shaft to the driven shaft, a disk secured to the upper end of the vertical shaft, a plurality of horizontal elongated spaced pawls secured to the lower side of the disk, said pawls radiating from the center of the disk in spaced relation with respect to each other, a circular toothed member rotated by the drive shaft, operating under the pawls and being so constructed and arranged that certain of the pawls engage teeth of the circular member driving the disk from the drive shaft, means for disengaging certain of the pawls and teeth of the circular member, and means for moving all of said pawls out of contact with the teeth of the circular member.

4. A positive drive variable speed transmission, comprising a housing, a drive shaft and a driven shaft mounted within the housing, a vertical shaft, means for transmitting movement of the vertical shaft to the driven shaft, a disk secured to the upper end of the vertical shaft, a plurality of horizontal, elongated pawls mounted on the underside of the disk and radiating from the center of the disk, a circular toothed member rotated by the drive shaft, operating under the pawls and being so constructed and arranged that certain of the pawls engage teeth of the circular member, driving the disk from the drive shaft, means for moving certain of the pawls out of contact with teeth of the circular toothed member, curved arms secured to the pawls and being extended upwardly through openings of the disk, a vertically movable control disk mounted above the arms and adapted to engage the arms, simultaneously moving all of the pawls out of contact with the teeth of the circular member.

5. A positive drive variable speed transmission comprising a housing having longitudinal grooves in the side walls thereof, an adjusting plate having its side edges operating within the grooves, said plate having a circular opening, a collar rotatably mounted within the opening and having teeth formed on the upper edge thereof, a drive shaft and a driven shaft mounted within the housing, means for transmitting movement of the drive shaft to the collar, mechanism for transmitting rotary movement of the collar to the driven shaft, comprising a vertical shaft, a disk secured to the upper end of the vertical shaft above the collar, elongated horizontal pawls mounted on the lower surface of the disk, said pawls radiating from the center of the disk and being so constructed and arranged that they engage the teeth of the collar at various positions throughout the lengh of the pawls, means for disengaging certain of the pawls and teeth, and means for moving the plate and collar longitudinally of the grooves, varying the relative positions of the teeth and pawls, whereby the speed of rotation of the driven shaft is varied.

ROBERT HAYNES.

REFERENCES CITED

The following references are of record in the file of this patent:

UNITED STATES PATENTS

| Number | Name | Date |
|---|---|---|
| 716,881 | Foccart | Dec. 30, 1902 |

FOREIGN PATENTS

| Number | Country | Date |
|---|---|---|
| 144,953 | Austria | Mar. 25, 1936 |
| 192,416 | Switzerland | Dec. 16, 1927 |